(12) United States Patent
Wehbe Spiridon

(10) Patent No.: US 9,869,579 B2
(45) Date of Patent: Jan. 16, 2018

(54) DEVICE AND METHOD FOR MEASURING VIBRATIONS OF A ROTOR

(71) Applicant: ALSTOM Renewable Technologies, Grenoble (FR)

(72) Inventor: Michel Wehbe Spiridon, Fislisbach (CH)

(73) Assignee: ALSTOM Renewable Technologies, Grenoble (FR)

(*) Notice: Subject to any disclaimer, the term of this patent is extended or adjusted under 35 U.S.C. 154(b) by 179 days.

(21) Appl. No.: 14/807,160

(22) Filed: Jul. 23, 2015

(65) Prior Publication Data
US 2016/0025552 A1 Jan. 28, 2016

(30) Foreign Application Priority Data

Jul. 28, 2014 (EP) ..................................... 14178750

(51) Int. Cl.
| | |
|---|---|
| *G01M 7/00* | (2006.01) |
| *G01H 1/00* | (2006.01) |
| *G01H 13/00* | (2006.01) |
| *G01M 7/08* | (2006.01) |

(52) U.S. Cl.
CPC ............. *G01H 1/006* (2013.01); *G01H 13/00* (2013.01); *G01M 7/08* (2013.01)

(58) Field of Classification Search
CPC .......... G01H 1/00; G01H 1/003; G01H 1/006; G01H 11/00; G01H 13/00; G01M 7/00; G01M 7/02; G01M 7/022; G01M 7/025; G01M 7/08
USPC ............... 73/12.01, 570, 579, 584, 593, 662
See application file for complete search history.

(56) References Cited

U.S. PATENT DOCUMENTS

| 1,511,583 A | * | 10/1924 | Seguin | .................. | G01R 23/02 |
| | | | | | 73/506 |
| 4,975,855 A | | 12/1990 | Miller et al. | | |
| 5,068,800 A | * | 11/1991 | Brook | .................... | G01H 13/00 |
| | | | | | 340/680 |
| 6,289,735 B1 | | 9/2001 | Dister et al. | | |
| 2002/0059831 A1 | | 5/2002 | Naudet et al. | | |

FOREIGN PATENT DOCUMENTS

| DE | 100 65 314 A1 | 7/2002 |
| WO | 2014/077275 A1 | 5/2014 |

* cited by examiner

*Primary Examiner* — Benjamin Schmitt
(74) *Attorney, Agent, or Firm* — Dority & Manning, P.A.

(57) ABSTRACT

The present disclosure relates to a measuring device for measuring vibrations of a rotor and to a method for measuring the vibrations of a rotor. Disclosed is a measuring device for measuring vibrations of a rotor of an electric machine having a guiding rod with a plate at one end of the guiding rod, the plate to abut at the rotor in operation, an actuator for inducing a shock to the rotor via the guiding rod and via the plate, and a monitor device for measuring the vibrations at the rotor caused by the induced shock.

8 Claims, 1 Drawing Sheet

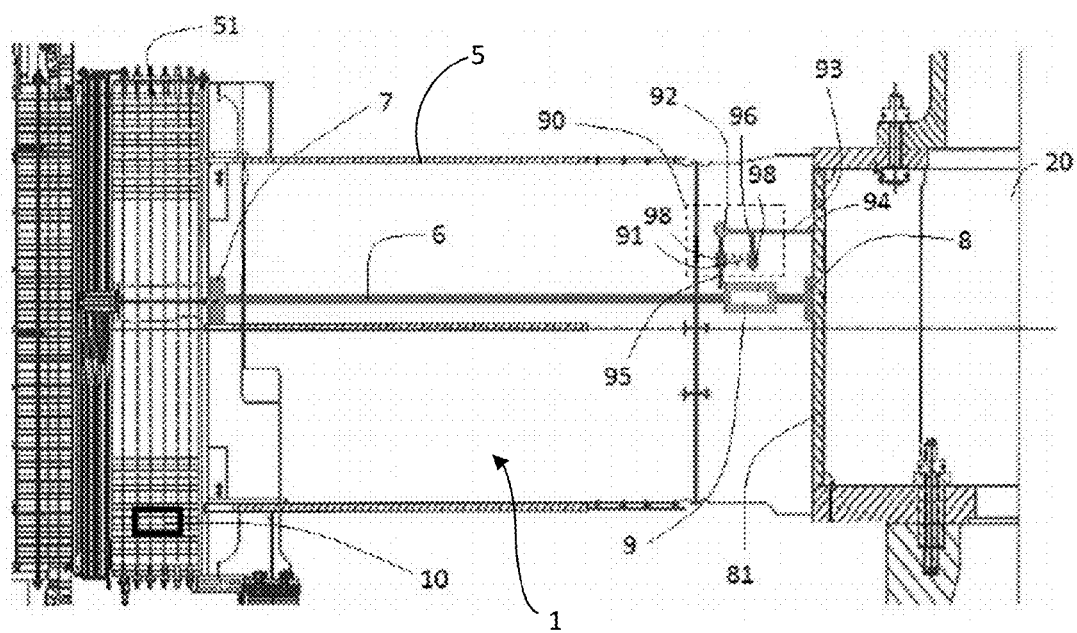

(12)  US 9,869,579 B2

DEVICE AND METHOD FOR MEASURING VIBRATIONS OF A ROTOR

CROSS-REFERENCE TO RELATED APPLICATIONS

This application claims priority to EP Application No. 14178750.7 filed Jul. 28, 2014, the contents of which are hereby incorporated in its entirety.

TECHNICAL FIELD

The present disclosure relates to a measuring device for measuring vibrations of a rotor and to a method for measuring the vibrations of a rotor.

BACKGROUND

The electric machine is in particular a rotating electric machine such as a synchronous generator to be connected to a gas or steam turbine (turbogenerator) or a synchronous generator to be connected to a hydro turbine (hydro generator) or an asynchronous generator or a synchronous or asynchronous electric motor or also other types of electric machines.

In the technical field of generators, especially hydrogenerators, a rotor rotates within a stator with a certain speed. The mechanical system is designed for best operation in certain speed ranges. Further, the excess of a critical speed of the rotor is to be avoided. The critical speed is a quantity depending on several influences and is thus a unique quantity for each rotor. Furthermore, the critical speed can change over time and is not a constant quantity. The critical speed is a machine data which is of interest for the operator. The document JPH 0991044 describes a calculation method for calculating the critical speed of a rotor. Based on a mere mathematical approach in this document the eigenfrequency of the respective rotor is calculated from a variety of quantities as tool weight, static load, bending moment, rotor material, shear force; and further the critical speed of the rotor is determined from this calculated eigenfrequency.

SUMMARY

It is an object of the invention to provide a measuring device and a measuring method to provide the critical speed of a rotor of an electric machine.

The object is solved with a measuring device as set forth herein and with a measuring method as set forth herein. Further examples of the invention are disclosed in the dependent claims.

BRIEF DESCRIPTION OF THE DRAWINGS

Further characteristics and advantages will be more apparent from the description of a preferred but non-exclusive embodiment of the measuring device and measuring method, illustrated by way of non-limiting example in the accompanying drawings.

FIG. 1 is a schematic cross-section of a rotor and a measuring device for measuring vibrations of the rotor with two plates held by a guiding rod, an actuator at the guiding rod to induce a shock to the rotor, and a monitor device for measuring the vibrations caused by the induced shock.

DETAILED DESCRIPTION

With reference to the FIGURE, this shows a schematic side view of a rotor, wherein like reference numerals designate identical or corresponding parts throughout the several views.

FIG. 1 is a schematic cross-section side view of a rotor 5 of an electric machine which rotates in a direction into the image plane. FIG. 1 shows the outer face of the rotor 5 at the left side and the inner face with the shaft 20 at the right side. Shown in a schematic way is a commonly used rotor 5 of a high power hydro generator for generating electric power. The rotor 5 is usually operated in a stator housing of a corresponding stator (not shown) of the hydro generator. On the left side of FIG. 1 a cross-section of a bearing 51 of the rotor 5 is shown to support the rotor 5 and to allow the free rotation of the rotor 5. The middle and the right part of the rotor 5 are designed commonly in an empty fashion, i.e. not as a laminated metal core, with the main parts being the inner shaft 20 of the rotor 5 and the outer sheath. The rotor 5 has rather the structure known as spider in the art. The herewith described measuring method and measuring device 1 can be applied to the rotor 5 in operation, i.e. with a rotating rotor 5 creating a centrifugal force. In the centre of the shown rotor 5 a measuring device 1 according to an example of the invention is shown. The measuring device 1 comprises a guiding rod 6 projecting through parts of the rotor 5 essentially radial to the rotor 5, i.e. perpendicular to the axis of the rotor 5. The guiding rod 6 is installed in the free space of the rotor 5 in between arms (not shown) of a rotor spider of the hydro generator. At the left end of the guiding rod 6 a plate 7 is releasably fixed to the guiding rod 6, also referred to as shock plate. The plate 7 is from metal as the guiding rod 6 and has a rectangular or circular shape. The plate 7 has a certain mass making it suitable for transferring an impulse or momentum to the rotor bearing 51 to which the plate 7 abuts in operation of the measuring device 1. The plate 7 at the left end of the guiding rod 6 is pressed against the bearing 51 of the rotor 5 at the outer part of the rotor 5. At the right end of the guiding rod 6 a holding plate 8 is fixed to the guiding rod 6 near the centre of the rotor 5. The holding plate 8 is from metal and has a rectangular or circular shape. The holding plate 8 abuts the frame near the shaft 20 of the rotor 5 at the right side. The function of the holding plate 8 is mainly to support the guiding rod 6 and to exert a counter force to the plate 7 at the other end of the guiding rod 6. An actuator 9 is arranged at the guiding rod 6 which encompasses the guiding rod 6 and which has a cylindrical shape. The actuator 9 is made from metal in this example and has a mass suitable to exert a proper impulse or momentum to the plate 7 sufficient to cause an effect at the material of the plate 7 and the rotor 5. The actuator 9 is designed here as a piston and is movable along the whole length of the guiding rod 6. Adjacent to the guiding rod 6, in the side view of FIG. 1 above the guiding rod 6, a locking system 90 is installed as part of the measuring device 1. The locking system 90 comprises an arrangement of levers 93 which is fixed to the wall 81 at the rotor 5 near the inner end. The locking system 90 further comprises a spring 91, a pivot 92, and adjustment sleeves 98 as described below. A first lever 94 of the arrangement of levers 93 projects essentially parallel to the guiding rod 6. A second lever 95 and a third lever 96 of the arrangement of levers 93 project perpendicularly from the first lever 94 in the direction of the guiding rod 6. Between these two levers, the second lever 95 and the third lever 96, a spring 91 is arranged which stores a retention force in the unstretched position which exerts on the second lever 95 and the third lever 96 to each other. Thus, the second lever 94 and the third lever 95 are held together by the spring force of the spring 91. For mechanical realization and as a mounting for the spring 91 the adjustment sleeves 94 are mounted at the second lever 95 and the third lever 96. The spring 91 engages the adjustment sleeves 98 at both levers 95, 96. The spring 91 is appropriate to exert a mechanical force which has a sufficient magnitude to withstand the centrifugal force acting on the actuator 9 when the rotor 5 rotates up to a certain rotation speed. In the position of FIG. 1 the actuator 9 or piston is blocked by the second lever 95 of the arrangement of levers 93 which engages the edge of the actuator 9 and blocks the centrifugal force exerted at the actuator 9. The pivot 92 connecting the first lever 94 with the second lever 95 holds the second lever 95 in the direction perpendicular to the guiding rod 6 in this view of FIG. 1. To operate the measuring device 1 the rotation speed of the rotor 5 is enhanced to a speed at which the centrifugal force on the actuator 9 excels the holding force of the spring 91. The second lever 95 is then swivelled around the pivot 92 releasing the actuator 9. Hence, the actuator 9 or piston accelerates along the guiding rod 6 assumed that the rotor 5 further rotates. The actuator 9 is accelerated to the left in the view of FIG. 1, which is the radial direction of the rotor 5 to the outside of the rotor 5. At the outer end of the guiding rod 6 the actuator 9 knocks against the plate 7 or shock plate at which the movement of the actuator 9 is stopped. The collision of the actuator 9 with the plate 7 creates a vibration in the area of the bearing 51 of the rotor 5. This vibration effect is measured by the measuring device 1. To this end the measuring device 1 comprises a monitor device 10 which is attached smoothly to the bearing 51. The monitor device 10 can be attached to the bearing 51 by clamping to the bearing 51 for example. The monitor device 10 is suitable for measuring the vibrations transmitted in the material of the bearing 51. In an example the monitor device 10 comprises an induction sensor which commonly measures vibrations by means of generating a magnetic field caused by the mechanical shifts of the surface of the bearing 51. This magnetic field is measured, amplified, and from the amplified signal the amplitude and frequency can be determined. Notably, the eigenfrequency of the bearing 51 or rotor 5 can be determined. The monitor device 10 has a display for showing the results or can optionally be read out from remote. The measuring device 1 and method as described can thus determine the system specific and time variable eigenfrequency in real time and with the rotor 5 rotating. The measuring method can also be repeated with different rotation speeds of the rotor 5 to enhance the sensitivity of the measurement. The monitoring device 10 can further include a calculator for calculating a system specific critical speed of the corresponding rotor 5. Here, the calculator determines the critical speed of the rotor 5 by multiplying the eigenfrequency with the number sixty (eigenfrequency f×60). The operator of the measuring device 1 receives the critical speed from the monitoring device 10 comprised by the measuring device 1. Disclosed here is a simple and efficient device and method to obtain the important quantity of the critical rotation speed of a rotor 5 which is of interest for the operator of the generator.

While the invention has been described in detail with reference to exemplary embodiments thereof, it will be apparent to one skilled in the art that various changes can be made, and equivalents employed, without departing from the scope of the invention. The foregoing description of the preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments as are suited to the particular use contemplated. It is intended that the scope of the invention be defined by the claims appended hereto, and their equivalents. The entirety of each of the aforementioned documents is incorporated by reference herein.

The invention claimed is:

1. A measuring device for measuring vibrations of a rotor of an electric machine comprising
   a guiding rod with a plate at one end of the guiding rod, the plate configured to abut at the rotor in operation of the measuring device,
   an actuator for inducing a shock to the rotor via the guiding rod and via the plate,
   the actuator comprising a piston movable along the guiding rod,
   a locking system that exerts a retaining force on the piston, wherein when a centrifugal force exerted on the piston from rotation of the rotor exceeds the retaining force, the piston moves along the guiding rod and impacts the plate, and
   a monitor device disposed relative to the rotor to measure vibrations at the rotor caused by induced shock from the piston impacting the plate.

2. The measuring device according to claim 1, wherein the locking system comprises a spring for providing the retaining force to the actuator.

3. The measuring device according to claim 1, wherein the monitor device comprises a frequency detector for determining the eigenfrequency of the rotor from the induced vibrations and a calculator for calculating a critical speed of the rotor from the determined eigenfrequency.

4. The measuring device according to claim 3, wherein the monitor device is attached to a bearing of the rotor.

5. The measuring device according to claim 1, wherein the guiding rod has a holding plate at an end thereof opposite from the plate configured to abut a wall to support and align the guiding rod.

6. A method for measuring the vibrations of a rotor of an electric machine using the measuring device of claim 1 comprising applying a shock to the rotor by the actuator and measuring the vibrations at the rotor induced by the shock.

7. The method according to claim 6, further comprising determining the eigenfrequency from the measured vibrations and calculating the critical speed of the rotor from the eigenfrequency.

8. The method according to claim 7, further comprising applying the retaining force to the actuator by a spring, rotating the rotor, and by centrifugal force at the actuator releasing the locking system of the spring and accelerating the actuator along the guiding rod to the plate, whereas the actuator exerts a shock to the plate and the rotor upon impacting the plate.

* * * * *